(12) United States Patent
Ruhland et al.

(10) Patent No.: US 8,591,621 B2
(45) Date of Patent: Nov. 26, 2013

(54) FILTER SYSTEM

(75) Inventors: Klaus-Dieter Ruhland, Meckenheim (DE); Eric Gillenberg, Speyer (DE); Oliver Steins, Römerberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 206 days.

(21) Appl. No.: 12/996,600

(22) PCT Filed: Apr. 1, 2009

(86) PCT No.: PCT/EP2009/053879
§ 371 (c)(1),
(2), (4) Date: Jan. 13, 2011

(87) PCT Pub. No.: WO2009/146962
PCT Pub. Date: Dec. 10, 2009

(65) Prior Publication Data
US 2011/0094197 A1   Apr. 28, 2011

(30) Foreign Application Priority Data
Jun. 6, 2008   (DE) .......................... 10 2008 027 279

(51) Int. Cl.
*B01D 46/00* (2006.01)
(52) U.S. Cl.
USPC ............................................. 55/498; 55/502
(58) Field of Classification Search
None
See application file for complete search history.

(56) References Cited

U.S. PATENT DOCUMENTS

| | | | |
|---|---|---|---|
| 4,720,292 A * | 1/1988 | Engel et al. | 55/337 |
| 5,350,515 A * | 9/1994 | Stark et al. | 210/493.2 |
| 5,484,466 A | 1/1996 | Brown et al. | |
| 6,004,366 A * | 12/1999 | Engel et al. | 55/428 |
| 7,070,642 B2 * | 7/2006 | Scott et al. | 55/498 |
| 7,083,661 B2 * | 8/2006 | Hasegawa et al. | 55/498 |
| 2005/0193695 A1 | 9/2005 | Holmes et al. | |
| 2007/0163945 A1 | 7/2007 | Ehrenberg et al. | |
| 2008/0203614 A1* | 8/2008 | Holzmann et al. | 264/257 |

FOREIGN PATENT DOCUMENTS

| | | |
|---|---|---|
| DE | 102006054447 A1 | 5/2008 |
| DE | 102007017091 | 10/2008 |

OTHER PUBLICATIONS

German Patent Office search report for DE 10 2008 027 279.5; PCT/EP2009/053879 search report with PCT publication.

* cited by examiner

*Primary Examiner* — Duane Smith
*Assistant Examiner* — Phillip Shao
(74) *Attorney, Agent, or Firm* — James Hasselbeck

(57) ABSTRACT

The invention relates to a filter system (10), particularly for an internal combustion engine, comprising a filter element (18) having a filter medium (20) that in particular is folded in a star shape, the filter medium having a coaxial form, and having at least one end and sealing body (22) that is made from an elastic potting compound and is disposed on a front of the filter medium (20). At least part of a support body (40) is embedded in the elastic potting compound of the end and sealing body (22).

10 Claims, 5 Drawing Sheets

FILTER SYSTEM

CROSS REFERENCE TO RELATED APPLICATIONS

This application is US National Stage Entry of international patent application no. PCT/EP2009/053879, filed Apr. 1, 2009 designating the United States of America, the entire disclosure of which is incorporated herein by reference. Priority is claimed based on Federal Republic of Germany patent application no. 10 2008 027 279.5, filed Jun. 6, 2008.

TECHNICAL FIELD

The invention concerns a filter system, in particular for an internal combustion engine, comprising a filter element with a filter medium that is in particular folded in a star shape and has preferably a coaxial form, comprising at least one sealing end member of an elastic potting compound arranged at an end face of the filter medium. Moreover, the invention concerns a filter element of such a filter system and a method for producing such a filter element.

PRIOR ART

DE 42 41 586 C1 discloses a filter system with a filter element in which a filter medium folded in a star-shape has at its end face a sealing end member of an elastic potting compound of polyurethane foam. The sealing end member provides an end closure of the filter element and acts moreover as a seal relative to a bottom area of a housing for the filter element. An additional seal for sealing the filter element is not required accordingly.

The invention has the object to design a filter system of the aforementioned kind, respectively, a method for producing a filter element of the filter system in such a way that it can be realized in a simple way and enables an optimal filtering action, wherein the sealing end member should provide the best-possible stability and sealing action.

SUMMARY OF THE INVENTION

This object is solved according to the invention in that at least one part of a support body is embedded in the elastic potting compound of the sealing end member.

According to the invention, a support body is provided that is embedded in the sealing end member and, in this way, stabilizes it with respect to shape and improves strength. Since the support body is embedded, the flexibility of the sealing end member is not limited and its sealing action is thus not impaired. Moreover, as a result of the embedded support body the vibration stability of the filter element at the seal seat is improved so that the sealing end member is connected better within the filter medium.

In an advantageous embodiment, the embedded part of the support body can extend across the folds of the filter medium. In this way, the filter medium is stabilized in particular across its radial extension.

Advantageously, the embedded part of the support body may have a plurality of spaced-apart ribs that extend between two coaxial rings of the support body wherein the areas between the ribs may be flowed through by the potting compound that is initially flowable in a manufacturing process and are filled with the solidified potting compound in the final state. The ribs impart to the otherwise elastic end member an optimal shape stability without its sealing function being impaired by it. Because the intermediate space between the ribs is penetrated by the potting compound, a reliable and permanent connection between the potting compound and the support body is produced. The rings secure the ribs of the support body even before embedding and ensure an additional stabilization of the completed sealing end member.

In order to improve the shape stability even more, the ribs may be curved in a coil shape. Moreover, a dynamic geometry of the ribs increases the reliability during the manufacturing process. Moreover, it is achieved that the initially flowable potting compound can flow about the ribs in a better and faster way and in this way the uniform distribution of the potting compound in the areas between the ribs is improved and air inclusions are prevented.

Moreover, the flanks of the ribs can be slanted. In this way, the reliability in the manufacturing process and the flowing action of the potting compound is further improved.

In a further advantageous embodiment, the radial outer ring may be a hollow cylinder wherein the ribs engage in the area of a rim of the hollow cylinder and the circumferential wall of the hollow cylinder engages circumferentially the filter medium in the area of its end face. The hollow-cylindrical shape of the outer ring imparts to the support body an additional stability in axial direction. Moreover, by means of the circumferential wall the support body, before embedding of the filter medium together with the support body within the potting compound, can be fastened to the filter medium and can be embedded together with it. Upon assembly the filter medium is guided and centered within the hollow cylinder and later on is secured by the circumferential wall of the hollow cylinder.

The support body may have furthermore guide tabs, in particular springy locking noses, that extend axially relative to the filter medium. The guide tabs, preferably locking noses, may engage corresponding recesses in the filter medium or may achieve an improved securing action of the filter medium in the hollow cylinder simply by an increased contact pressure. In this way, the stability of the entire filter element is significantly improved without the sealing function of the elastic end member being impaired thereby.

In order to secure the filter medium at a spacing to the support body so that during the manufacturing process the still flowable potting compound can flow through between the end face of the filter medium and the support body, the embedded part of the support body may have projections for supporting the filter medium. In this way, the potting compound that is still flowable during the manufacturing process can penetrate optimally into all areas between the support body and the filter medium and between the folds of the filter medium so that an optimal connection between the filter medium, the potting compound, and the support body and an optimal sealing function are achieved.

Advantageously, the support body may be made of plastic material. Support bodies of plastic material are lightweight, can be produced simply and inexpensively, for example, by casting or by stamping. Accordingly, metal is not needed.

The elastic potting compound may be preferably polyurethane foam. Polyurethane foam is easily flowable during the manufacturing process and is distributed in the best possible way between the filter medium and the support body so that a homogenous and reliable connection is produced. In the solidified state polyurethane foam is elastic so that an optimal sealing action is enabled.

In a method for producing a filter element in particular of a filter system of the aforementioned kind, the initially flowable potting compound is filled into a potting cup, a support body is fastened to the end face of the filter medium, the filter medium, with the support body leading, is embedded in the potting compound, and, after solidification of the potting compound, the potting cup is separated from the filter element. In this way, in a few simple processing steps a filter element having optimal filtering action can be produced whose end member has the required elasticity for the ideal sealing action and by means of the support body a shape stability is achieved that is advantageous for the filtering function and the sealing function.

BRIEF DESCRIPTION OF THE DRAWINGS

Further advantages, features and details of the invention result from the following description, in which embodiments of the invention will be explained in more detail with the aid of the drawing. A person skilled in the art will consider the features disclosed in combination in the drawing, the description and claims also individually and combine them to expedient further combinations. It is shown in:

EMBODIMENT(S) OF THE INVENTION

Figure 1:
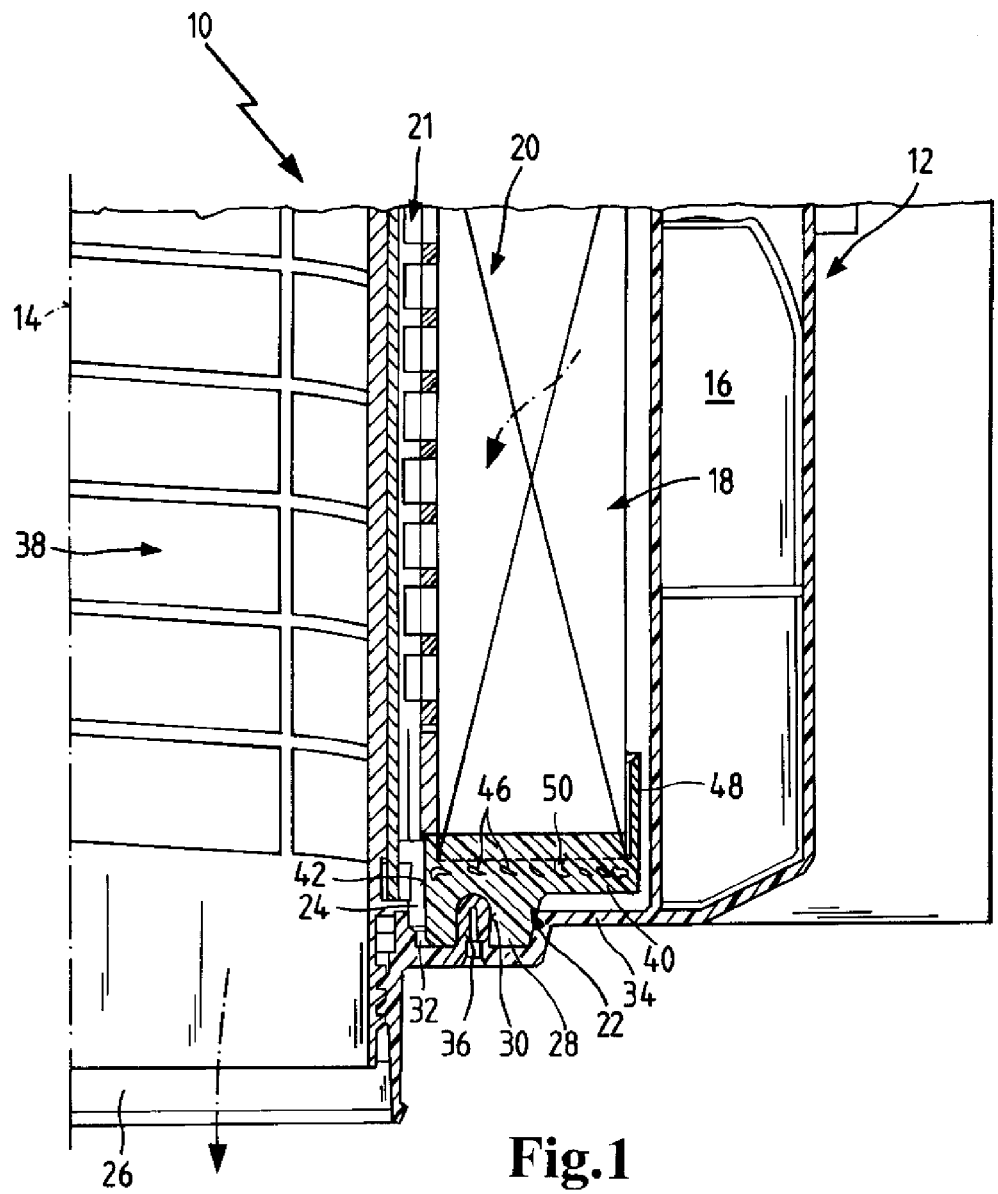
FIG. 1 schematically a longitudinal section of a filter system with a filter element that has an elastic sealing end member in which a support body is embedded.

In FIG. 1 a detail of one half of a filter system identified as a whole by reference numeral 10 is illustrated in longitudinal section. The filter system 10 comprises a housing 12 that is substantially configured coaxially to a housing axis 14 and has an inlet that it is not illustrated in FIG. 1.

The inlet is connected to a radial outer inlet area 16 of the housing 12. The filter system 10 serves for filtering the intake air of an internal combustion engine, not illustrated. By means of the inlet and the inlet area 16 the air to be filtered is supplied.

Within the filter system 10 there is coaxial to the housing axis 14 a filter element 18. It has a filter medium 20 that is folded in a star shape and as a whole is cylindrical. In the interior of the filter medium 20 there is arranged a coaxial central tube 21 that has a plurality of through openings for the filtered air.

Figure 2:
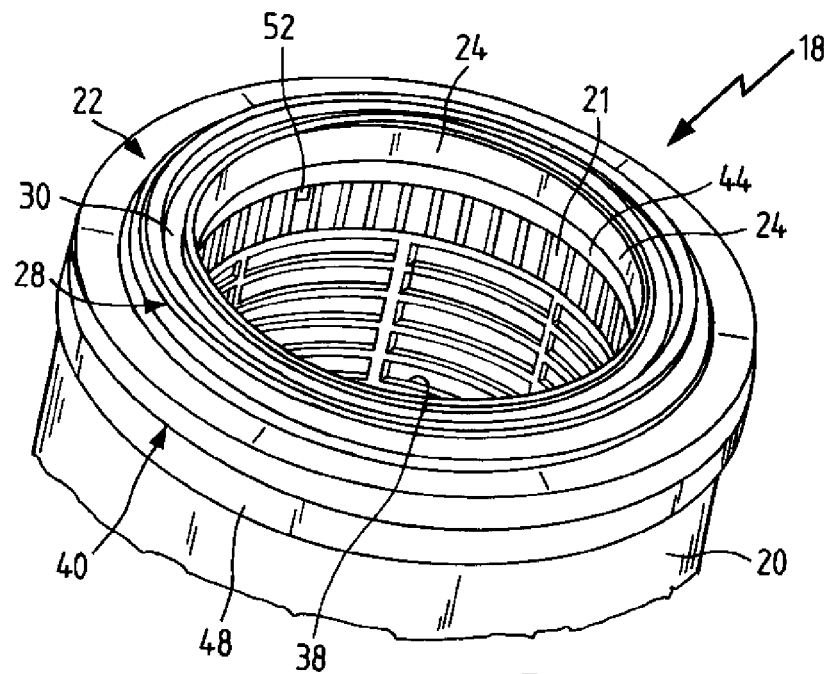
FIG. 2 schematically a detail illustration of an end face of the filter element of FIG. 1 with the elastic sealing end member.

At the end faces, the filter element 18 has elastic sealing end members 22 of which in FIG. 1 only the one at the outlet end is illustrated. A detail view of the outlet end face of the filter element 18 is illustrated in FIG. 2. The sealing end member 22 has an opening 24 that is coaxial to the housing axis 14. The air to be filtered flows from the inlet area 16 through the filter element 18 and flows filtered through an outlet 26 of the housing 12 to the internal combustion engine.

The sealing end member 22 is made of an elastic potting compound of polyurethane foam. It has on the side that is facing away from the filter medium 20 a bead 28 that is coaxial to its central axis and extends in axial direction. The central axis of the sealing end member 22 coincides with the housing axis 14 in the mounted state of the filter system 16. The radial inner flank of the bead 28 forms the inner circumferential side of the sealing end member 22. The bead 28 extends in radial direction approximately across half of the sealing end member 22.

The bead 28 has had its end face facing away from the filter medium 20 an annular groove 30. In the mounted state of the filter element 18 the bead 28 corresponds to a matching recess 32 in a bottom 34 of the housing 12. In this connection, an annular collar 36 that extends axially to the housing axis 14 on the bottom 34 engages the annular groove 30. The bead 28 and the annular groove 30 in this way interact sealingly with the recess 32 and the annular collar 36 and form a seal between the raw air area (inlet area 16) and the clean air area in the interior 38 of the filter element 18.

Figure 5:
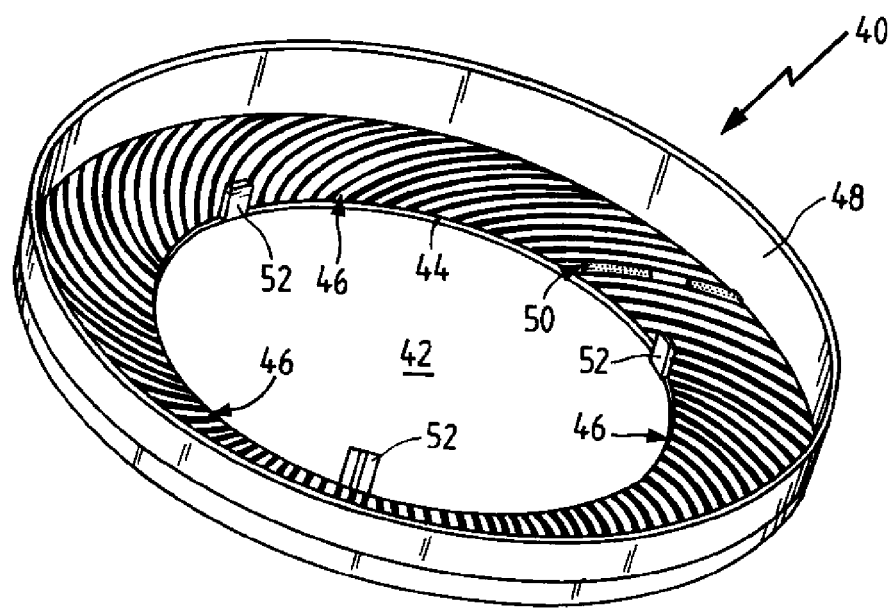
FIG. 5 schematically an isometric illustration of the support body of FIGS. 1 to 4.
Figure 6:
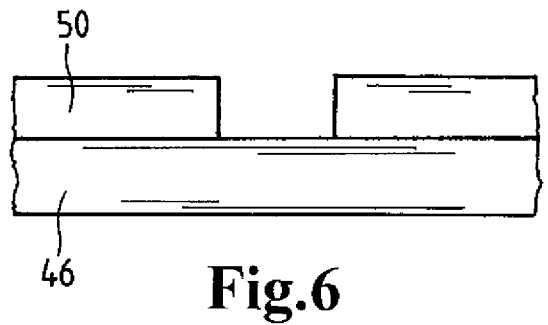
FIG. 6 a side view of a rib of the support body of the filter element of FIGS. 1 to 5 provided with a projection.

In the potting compound of the sealing end member 22 a support body 40 is embedded. The support body 40 is shown in detail in FIG. 5. The support body 40 is made of a solid plastic material. It has substantially the shape of a cylindrical cup that is coaxial to the housing axis 14 and is open toward the filter medium 20. The bottom of the cup has a coaxial opening 42 that is somewhat greater than the opening 24 of the housing 12. The opening 42 in the bottom of the cup is limited in radial direction by a radial inner ring 44. The bottom of the cup itself is formed by a plurality of spaced-apart ribs 46 that extend between the radial inner ring 44 and the rim of a hollow cylinder 48 that forms the circumferential side of the support body 40. The ribs 46 are curved in a coil shape. Some of the ribs 46 have at their side that is facing the interior of the cup monolithically formed projections 50, interrupted in longitudinal direction, for supporting the filter medium 20. The projections 50 are distributed about the bottom of the cup of the support body 40. In FIG. 6 one of the ribs 46 with an interrupted projections 50 is illustrated in a side view.

Figure 7:
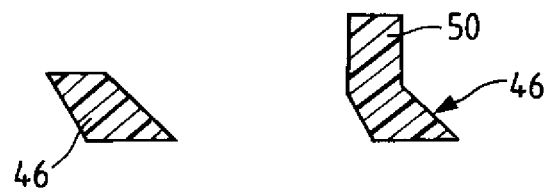
FIG. 7 a profile illustration of two ribs of the support body of the filter element of FIGS. 1 to 5.

The lateral flanks of the ribs 46 are slanted so that during the manufacturing process the initially flowable potting compound can flow easily into the intermediate areas between the ribs 46 and can pass through them. In FIG. 7 two of the ribs 46 are shown in profile.

On the radial inner ring 44 there are moreover, circumferentially distributed, three guiding tabs 52 that extend parallel to the circumferential wall 48.

For producing the filter element 18 the following steps are performed.

Figure 4:
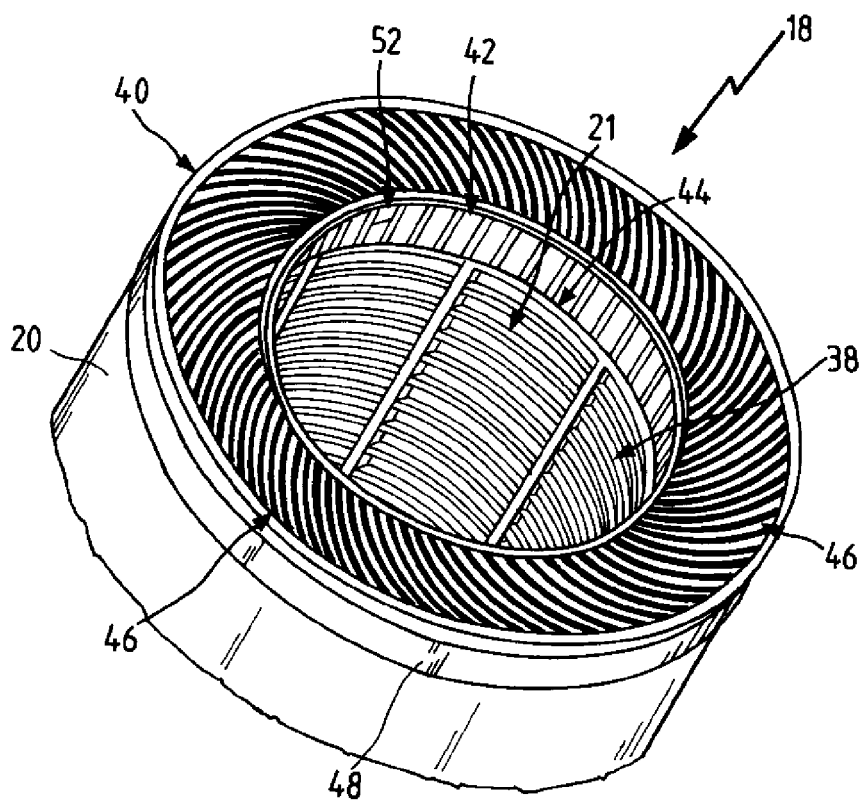
FIG. 4 schematically an isometric illustration of the end face of the filter element of FIGS. 1 to 3 with the support body, before potting with an elastic potting compound.

First, the central tube 21 is positioned in the folded filter medium 20 and the support body 40, with its open side, is pushed onto the end face of the filter medium 20, as is illustrated in FIG. 4. In this connection, the circumferential wall 48 engages from the exterior the filter medium 20 in the area of the end face and the guide tabs 52 correspond with the central tube 21. In this way, the filter element 18 is already provided with a certain shape stability at this point.

First, a flowable polyurethane foam is filled in as a potting compound Into a potting cup, not illustrated, that determines the outer shape of the sealing end member 22.

Figure 3:
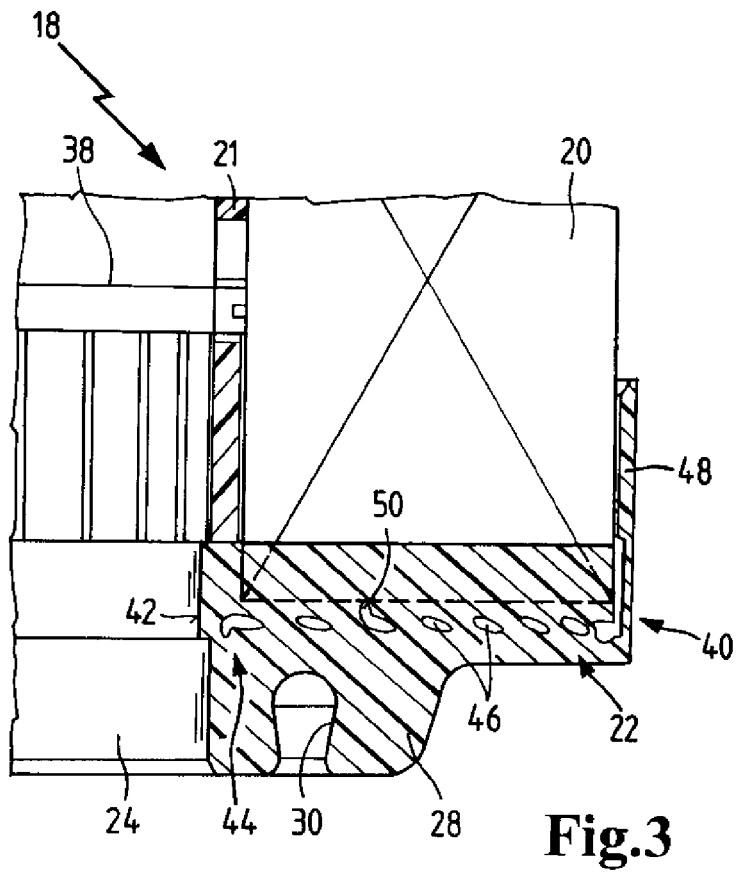
FIG. 3 schematically an isometric illustration of the end face of the filter element of FIGS. 1 and 2.

The premounted filter medium 20 is pressed, with the support body 40 leading, into the potting compound in the potting cup. The dynamic geometry of the ribs 46, in particular the spacing between the ribs 46, their slanted flanks, their coil-shaped extension, and the projections 50, enable that the still flowable polyurethane foam may fill quickly all intermediate spaces and is driven in the direction of the end face of the filter medium 20. The polyurethane foam embeds the ribs 46 of the support body 40 completely and generates a gap-free seal-tight connection between the support body 40 and the filter medium 20. After solidification of the polyurethane foam the potting cup is separated from the completed filter element 18 that is now provided with the solid but still elastic sealing end member 22, as illustrated in FIGS. 2 and 3.

The completed filter element 18 can now be inserted, as is well known, into the housing 12 of the filter system 10 illustrated in FIG. 1.

In the filter system 10 the sealing end member 22 may also be made, instead of from polyurethane foam, of another elastic initially flowable potting compound.

Figure 8:
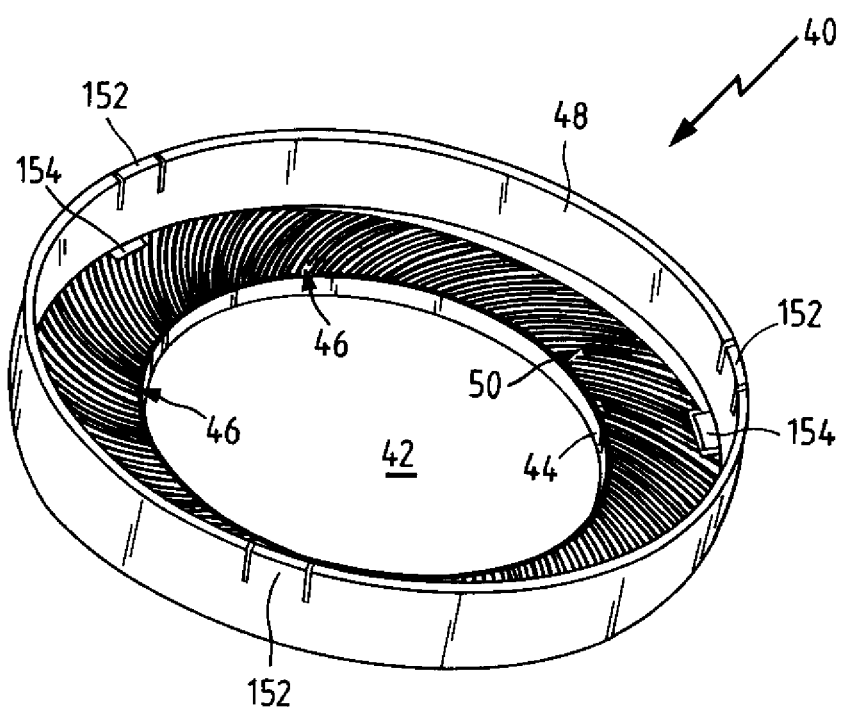
FIG. 8 schematically an isometric illustration of a second embodiment of a support body that is similar to the support body of FIGS. 1 to 7.
Figure 9:
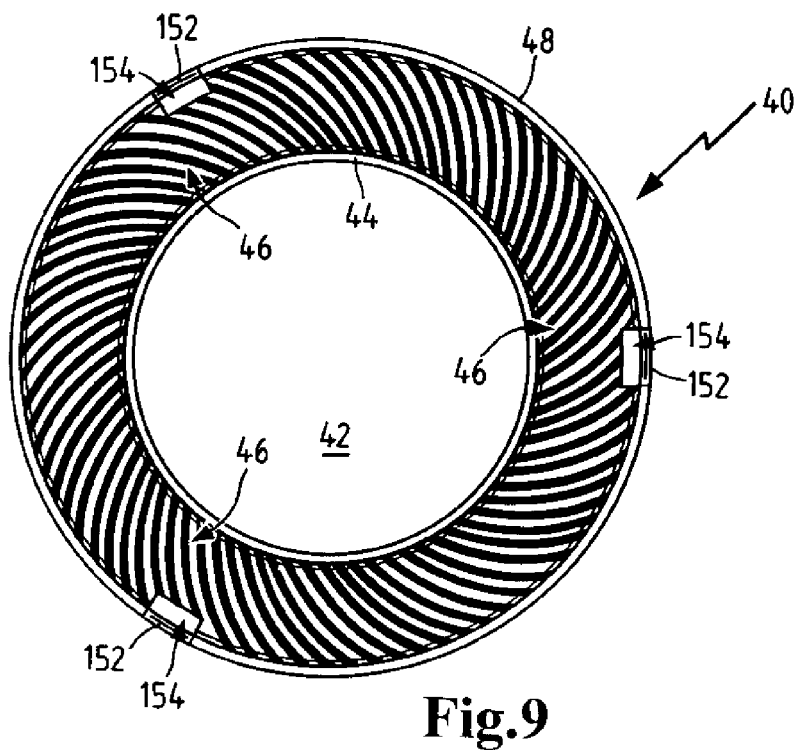
FIG. 9 schematically a plan view of the support body of FIG. 8.
Figure 10:
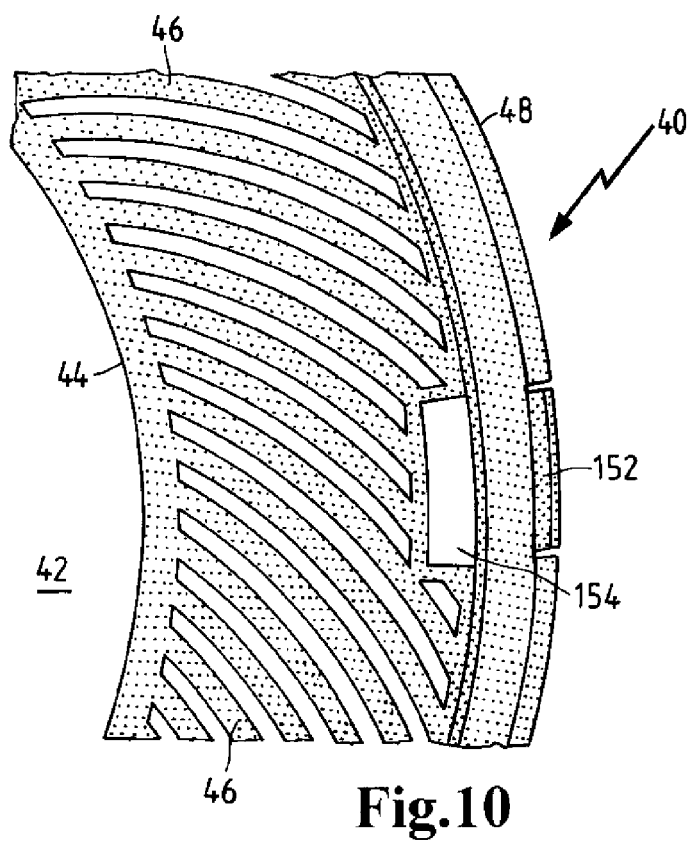
FIG. 10 schematically a detail view of the support body of FIGS. 8 and 9.

In FIGS. 8 to 10 a second embodiment of a support body 40 is illustrated. Those elements that are similar to those of the first embodiment of FIGS. 1 to 7 are identified with the same reference numerals. The second embodiment differs from the first in that, instead of the guide tabs 52 on the radial inner ring 44, springy guide and securing tabs 152 are provided in the circumferential wall 48 of the support 44. The guide and securing tabs 152 have at their rim that is facing away from the bottom of the cup radially inwardly extending locking noses.

In the rib geometry of the bottom of the cup there is a window 154, respectively, in the radial outer area that is aligned with the guide and securing tabs 152 in axial direction; they serve for mold removing of the guide and sealing tabs 152.

The invention claimed is:

1. A filter system for an internal combustion engine, comprising:
    a filter element having an axis of elongation, said filter element including
        a filter medium folded in a star shape and has a coaxial shape;
        at least one sealing end member of an elastic potting compound arranged at an end face of said filter medium; and
        at least one part of a support body embedded into said potting compound of said at least one sealing member;
said support body;
    wherein said support body includes
        a radial inner ring;
        an outer ring coaxial with said inner ring of said support body;
        a plurality of spaced-apart ribs that extend between and connect to said coaxial outer and inner rings of said support body at a rim end of said support body;
    wherein said embedded part of said support body extends across said folds at said end face of said filter medium;
    wherein spacing between said ribs is open and flowed through by said potting compound embedding said ribs in said sealing end member potting compound providing a seal-tight connection of said support body on said end face of said filter medium;
    wherein said outer ring forms a hollow cylinder extending axially away from said ribs, extending over a portion of a radial exterior of said filter medium, said hollow cylinder having a circumferential wall engaging said filter medium from a radial exterior of filter medium.

2. The filter system according to claim 1, wherein
    said potting compound is initially flowable during a manufacturing process and, in a final state, said ribs are solidly embedded into said solidified potting compound of said at least one sealing member.

3. The filter system according to claim 2, wherein said ribs are curved in a coil shape.

4. The filter system according to claim 2, wherein said ribs include sidewall flanks that are slanted relative to a said axis of said filter element.

5. The filter system according to claim 2, wherein
    said ribs engage in said rim of said hollow cylinder and said circumferential wall of the hollow cylinder engages circumferentially against said filter medium in a circumferential area abutting said filter medium end face.

6. The filter system according to claim 1, wherein
    said support body comprises axially inwardly extending guide tabs, said guide tabs extending axially inwardly relative to said filter medium,
    wherein said guide tabs are configured as springy locking noses.

7. The filter system according to claim 2, wherein at least some of said ribs of said embedded part of said support body have axially inwardly extending projections contacting and supporting said end face of said filter medium.

8. The filter system according to claim 1, wherein said support body is made of plastic material.

9. The filter system according to claim 1, wherein said elastic potting compound is polyurethane foam.

10. The filter system according to claim 1, further comprising:
    a filter housing receiving said filter element, said filter housing having a bottom wall with a recess receiving at least a portion of said at least one sealing member.

* * * * *